United States Patent [19]

Taniguchi et al.

[11] 4,044,810
[45] Aug. 30, 1977

[54] PNEUMATIC TIRE FOR AIRPLANES

[75] Inventors: Motoaki Taniguchi, Higashi-Yamato; Toyomi Iwata, Sayama, both of Japan

[73] Assignee: Bridgestone Tire Company Limited, Tokyo, Japan

[21] Appl. No.: 618,860

[22] Filed: Oct. 2, 1975

[30] Foreign Application Priority Data

Oct. 23, 1974 Japan .............................. 49-122137

[51] Int. Cl.$^2$ .............................................. B60C 11/06
[52] U.S. Cl. .............................. 152/209 R; 152/352 A
[58] Field of Search ............... 152/209 R, 330 R, 354, 152/357 R, 352

[56] References Cited

U.S. PATENT DOCUMENTS

| | | | |
|---|---|---|---|
| 1,348,200 | 8/1920 | Beaumont | 152/209 R |
| 3,247,880 | 4/1966 | Batori | 152/209 R |
| 3,517,720 | 6/1970 | Brown | 152/209 R |

Primary Examiner—Drayton E. Hoffman
Attorney, Agent, or Firm—Sughrue, Rothwell, Mion, Zinn and Macpeak

[57] ABSTRACT

A pneumatic tire for airplanes which can reduce a ratio of the load subjected to a tread center zone of the tire to the load subjected to two shoulder zones thereof and improve a high speed durability of the tire without sacrificing a wear resistance thereof is disclosed. The tire comprises a pair of circumferentially extending grooves each arranged at a shoulder portion of the tire and substantially symmetrically and equally spaced apart from a crown center of the tire. A distance between the circumferentially extending grooves is from 50% to 95%, preferably 55% to 80% of a tread width and serves to divide a tread portion of the tire into a center zone and two shoulder zones. The outer surfaces of the shoulder zones are protruded from the circumferentially extending grooves toward the outside thereof by a step having a level difference from 0.5 mm to 6 mm.

8 Claims, 13 Drawing Figures

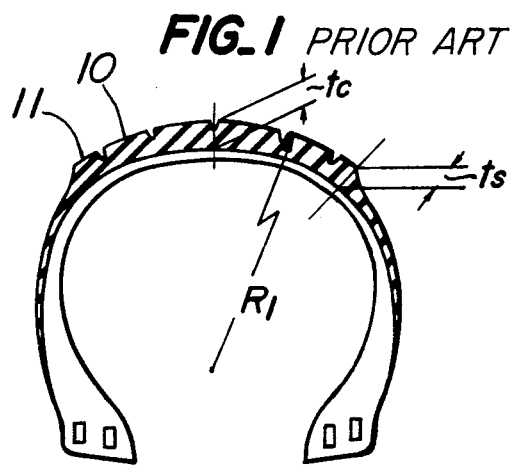
FIG._1 PRIOR ART
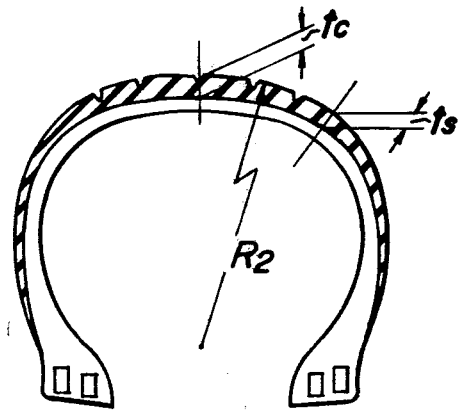
FIG._2a PRIOR ART
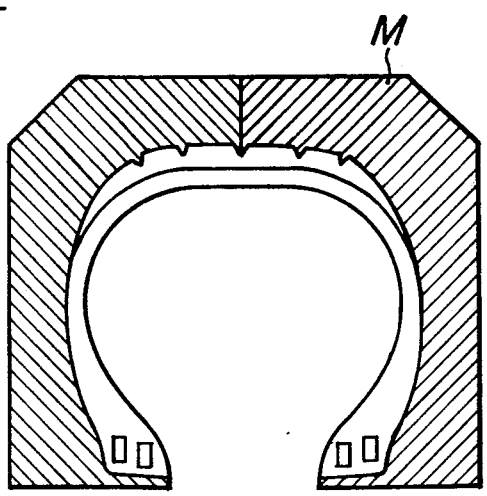
FIG._2b PRIOR ART

FIG_4a PRIOR ART
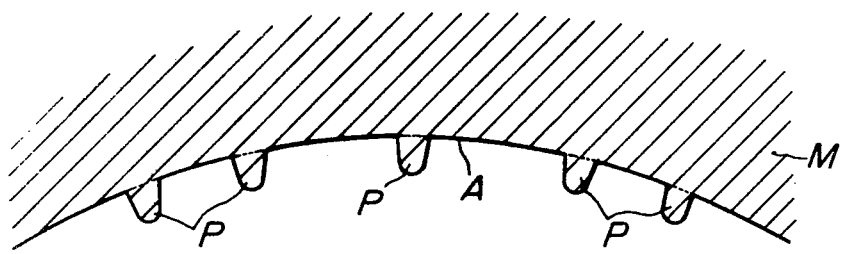
FIG_4b PRIOR ART
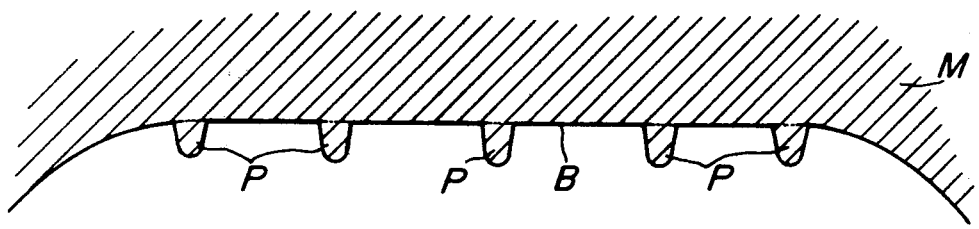
FIG_4c PRIOR ART
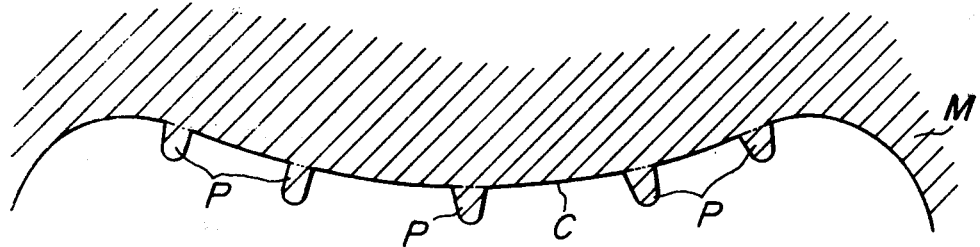

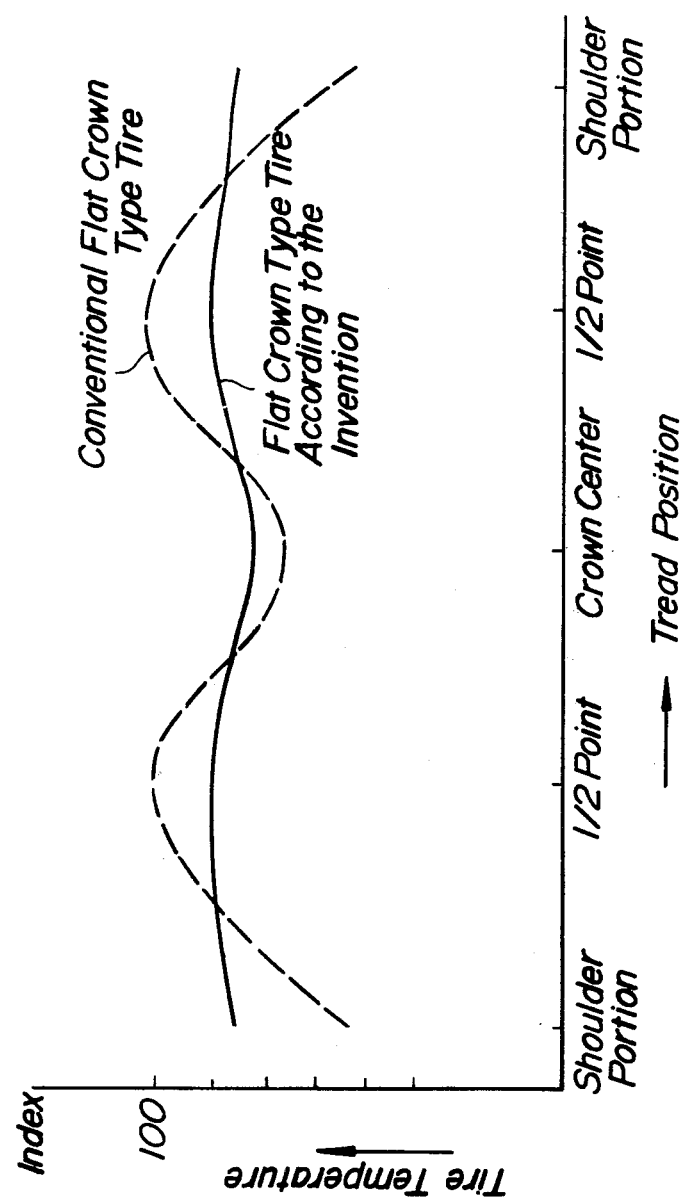

PNEUMATIC TIRE FOR AIRPLANES

This invention relates to a pneumatic tire for airplanes having a tread whose sectional configuration is so shaped that performance characteristics required for the tire can be improved.

The most important performance characteristics required for the pneumatic tire for airplanes consist in increased life of the tire when it is used at a high speed, that is, a high speed durability, mainly for safety's sake and wear resistance mainly from the economical standpoint.

These two performance characteristics contradict each other in design of tires. Heretofore it has been the common practice to design the tire by making its safety the first consideration at the sacrifice of economy.

In FIG. 1 is shown in section a conventional tire whose radius of curvature $R_1$ of the outer surface of a tread portion of the tire (hereinafter will be called as a tread radius) is made relatively small by laying stress on the safety of tire, that is, by laying stress on the high speed durability. As a result, the wear resistance of the tire becomes always degraded and involved the sacrifice of economy.

In the case of designing tires, it is known that an increase of the tread radius results in an improvement of the wear resistance of the tire. The mere increase of the tread radius, however, causes a thickness ts at a shoulder portion of the tire to increase with respect to a tread thickness tc at a crown center of the tire. As a result, the temperature of the tire in use becomes considerably high at its shoulder portion and hence the high speed durability becomes degraded, and this involves a difficult problem of endangering safe running of the tire.

The tires which have been applied in practice for airplanes as well as subjected to an indoor drum type testing machine have yielded the surprising result that damage mainly occurs to the crown center, and, in fact, the temperature measured at the shoulder portion is of the order of 60% the temperature measured at the crown portion.

By taking the above described results into consideration, tires for airplanes shown in FIGS. 2a and 3a have been proposed.

The tire shown in FIG. 2a is molded in a mold M shown in FIG. 2b such that the crown portion is flat along the crown center portion and that the thickness ts of the shoulder portion of the tire is substantially equal to the thickness tc of the crown center portion thereof. Then, the inside of the tire is pressurized to deform it into a shape shown in FIG. 2a. In this pressurized condition, the tread radius $R_2$ of the tire shown in FIG. 2a becomes considerably larger than the tread radius $R_1$ of the tire shown in FIG. 1.

The tire shown in FIG. 3a is molded in a mold M shown in FIG. 3b such that the crown portion is concave toward the outside of the mold M and that the thickness ts of the shoulder portion of the tire is substantially equal to the thickness tc of the crown center portion thereof. Then, the inside of the tire is pressurized to deform it into a shape shown in FIG. 3a. In this pressurized condition, the tread radius $R_3$ of the tire shown in FIG. 3a also becomes considerably larger than the tread radius $R_1$ of the tire shown in FIG. 1.

Both the tires shown in FIGS. 2a and 3a are capable of increasing the rigidity of the tread portion when the inside of the tire is pressurized and hence are capable of improving both the wear resistance and the high speed durability.

The temperature of the tread portion of each of the tires shown in FIGS. 2a and 3a in use is lower at its crown center portion if compared with that of the tire shown in FIG. 1 in use, but the temperature of that portion of the tread which is intermediate between the crown center and the shoulder portion (this portion will hereinafter be called as ½ point of the tread) is rather higher than that of the tire shown in FIG. 1 in use and the temperature of the shoulder portion is substantially the same as that of the tire shown in FIG. 1.

As a result, the tires shown in FIGS. 2a and 3a serve to distribute that region of the tread to which occurs damage due to heat produced when the tire runs at a high speed in a widthwise direction from the crown center portion to near the ½ point of the tread. The tires shown in FIGS. 2a and 3a, however, do not always satisfy the performance characteristics required for tires for airplanes whose ultra high speed is becoming ever higher.

A pneumatic tire for airplanes is
1. higher in its inside pressure in use, and
2. severe upon its heat generating surface in use if compared with pneumatic tires used in general. This causes a radius of curvature R of a crown portion of the pressurized tire to make small.

As a result, during running of the tire a contact pressure against the ground at that rib of the crown portion which is located near the crown center becomes higher. The tire is thus rotated around a center which is located near the above mentioned crown portion. In this case, a rib of a crown shoulder portion is brought into forced rotation by a difference of the diameter between the crown center portion and both the shoulder portions. As a result, a skid of the shoulder portion relative to the ground becomes large, whereby wear of the shoulder portion is further accelerated than that of the crown center portion and there occurs a so-called eccentric wear at the shoulder portion.

When an airplane with its conventional tire has been subjected to the above mentioned eccentric wear is turned on the ground, the outside edge of the inside rib 10 next to the shoulder rib 11 is directly subjected to a strong side force which is transmitted from the ground to the tire inclusive of that force subjected to the shoulder rib prior to occurrence of the eccentric wear. This side force sometimes results in a breakage of corners of the shoulder rib.

Therefore, an object of the invention is to provide a pneumatic tire for airplanes which can obviate the above mentioned disadvantages of the conventional tires and which is possessed of improved high speed durability without making the sacrifice of wear resistance.

Another object of the invention is to provide a pneumatic tire for airplanes in which the temperature of the tread is distributed such that the crown center zone to both the shoulder portions is substantially uniform in temperature and that the temperature toward the shoulder sides becomes slightly higher, thereby preventing the tire from being prematurely broken due to heat produced at a given zone of the tire and improving high speed durability.

The inventors have found out after the result of their study and investigation that the above mentioned objects can reliably be attained.

A feature of the invention is the provision of a pneumatic tire for airplanes comprising a plurality of circumferentially extending grooves and a plurality of circumferentially extending ribs separated from each other by means of these grooves, characterized by comprising a pair of circumferentially extending grooves each arranged at a shoulder portion of the tire and substantially symmetrically and equally spaced apart from a crown center of the tire, a distance between said circumferentially extending grooves arranged at the shoulder portions being from 50% to 95% of a tread width and dividing a tread portion of the tire into a center zone and two shoulder zones, a sectional contour defining an outer surface of said tread portion being a continuous curve in respective zones, and the outer surface of the tire being protruded at both said shoulder zones from said circumferentially extending grooves arranged at the shoulder portions of the tire toward the outside thereof by a step having a level difference from 0.5 mm to 6 mm, whereby a ratio of the load subjected to said center zone to the load subjected to said two shoulder zones is reduced, thereby improving a high speed durability of the tire without sacrificing a wear resistance thereof.

The invention makes it possible to protrude the shoulder rib toward the outside of the tire and hence increase the contact pressure of the shoulder rib against the ground. In addition, the invention is capable of reducing a difference between the outer diameter of the crown center portion and the outer diameter of the shoulder portion, whereby wear due to forced rotation of the shoulder rib is reduced to make wear resistance of the shoulder portion substantially equal to that of the crown center portion. Thus, the invention renders it possible to prevent the eccentric wear of the shoulder rib which has been encountered with the conventional tires.

The invention will now be described in greater detail with reference to the accompanying drawings, wherein:

FIG. 1 is a vertical center sectional view of a conventional convex crown type tire for airplanes after the inside has been pressurized;

FIG. 2a is a vertical center sectional view of a conventional flat crown type tire for airplanes after the inside has been pressurized;

FIG. 2b is a vertical center sectional view of a mold and the tire shown in FIG. 2a;

FIG. 3b is a vertical center sectional view of a mold and the tire shown in FIG. 3a;

FIGS. 4a, 4b and 4c are enlarged vertical center sectional views of the molds for molding the tread portions of the conventional tires shown in FIGS. 1, 2 and 3, respectively;

FIG. 6 is graphs which compare the temperature distribution over the tread portion of the conventional flat crown type tire molded by the mold shown in FIG. 4b with that of the flat crown type tire according to the invention molded by the mold shown in FIG. 5b.

Referring to FIGS. 4a, 4b and 4c, each of curves A, B and C defining a curvature of the inside surface of a mold M, that is, a curvature of the outside surface of a tire consists of one continuous curve.

Each mold M is provided at its inside continuous curved surface with projections P for forming circumferentially extending grooves of a tire that are suitably arranged in dependence with performance characteristics required for the tire.

If the tire is vulcanized and pressurized under a given inside pressure in the mold M, the tread portion thereof becomes convex toward the outside of the mold M and the tread radius of the crown center of the tire becomes larger in the order shown in FIGS. 4a, 4b and 4c.

Figure 3A:
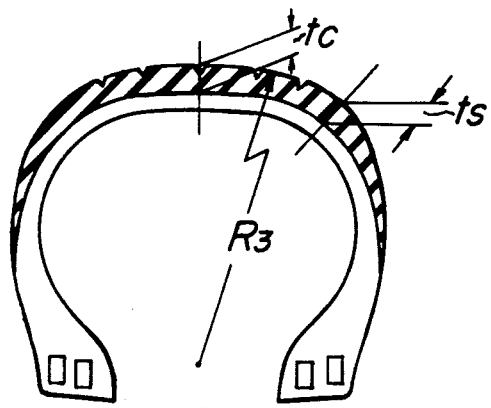
FIG. 3a is a vertical center sectional view of a conventional concave crown type tire for airplanes after the inside has been pressurized.
Figure 3B:
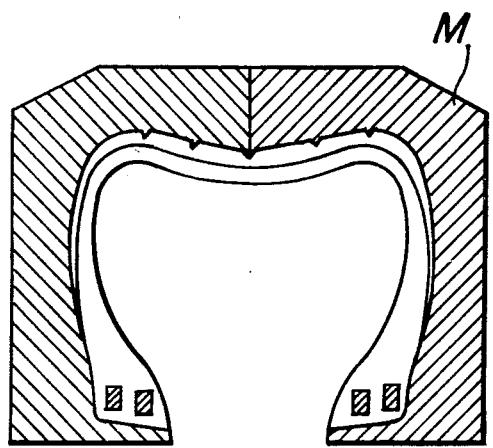
Figure 5A:
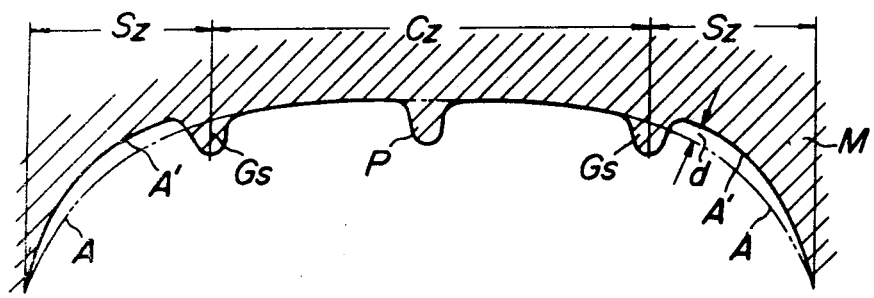
FIGS. 5a, 5b and 5c are enlarged vertical center sectional views of molds for molding tread portions of convex, flat and concave crown type tires for airplanes according to the invention, respectively.

In a tire according to the invention molded by a mold M shown in FIG. 5a, a continuous curve A of the mold M for defining the curvature of the tread of the tire is divided into three portions, that is, a center zone Cz and two shoulder zones Sz, Sz. The center zone Cz is protruded inwardly from both the two shoulder zones Sz, Sz by a step having a level difference of $d$ to deform the continuous curve A into a discontinuous curve A'-A-A'.

Figure 5B:
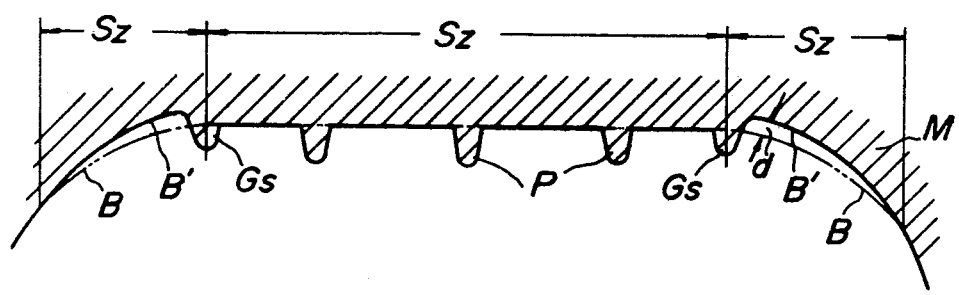
Figure 5C:
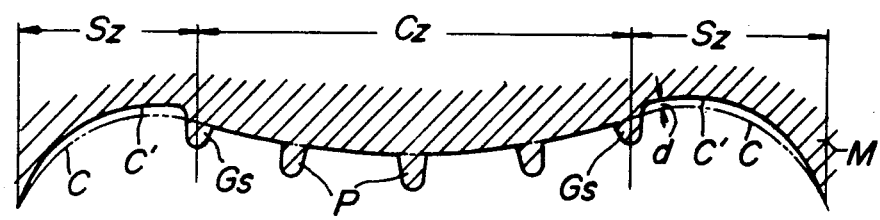
Figure 5D:
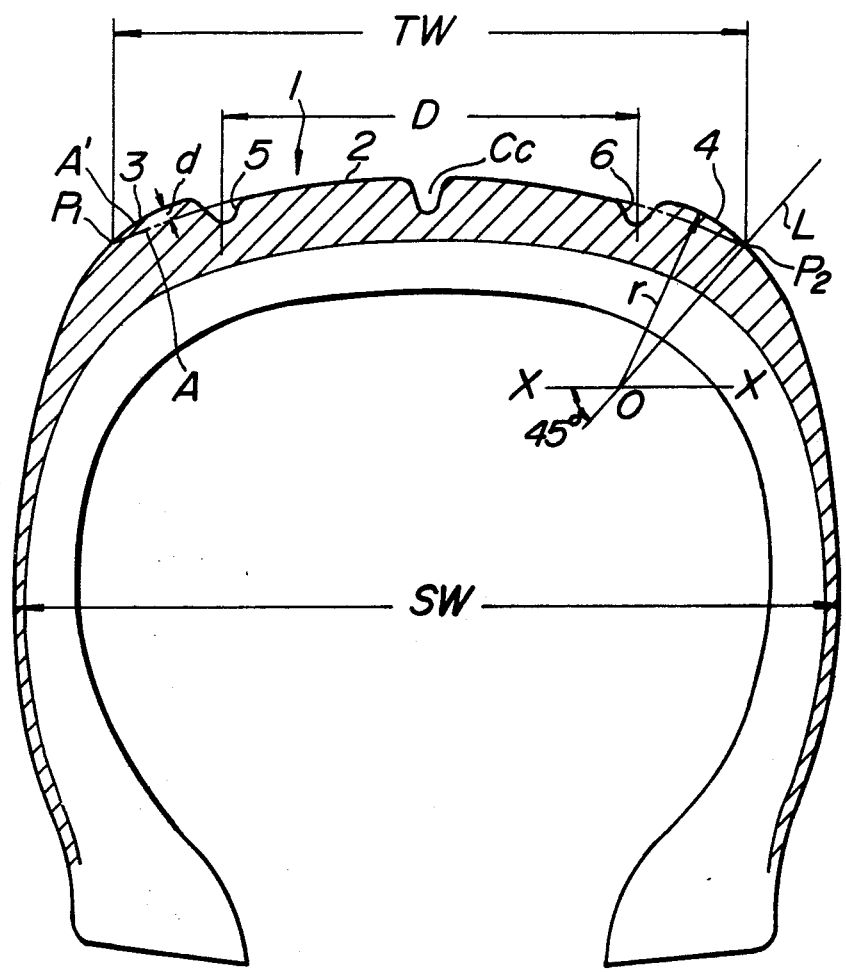
FIG. 5d is a vertical center sectional view of a tire for airplanes according to the invention.

The tire thus molded and vulcanized in the mold M is mounted on a tire-holding rim (not shown), and then pressurized to provide a tire shown in FIG. 5d. In the tire shown in FIG. 5d, the step $d$ between the continuous curve A and the discontinuous curve A' is still maintained even after the inside of the tire has been pressurized.

As a result, it is possible to reduce the above mentioned difficult problem encountered with the performance characteristics of the conventional tire near both sides of the crown center Cc of the tire.

In accordance with the invention, after pressurizing the inside of the tire, a width TW of a tread portion 1 is made from 70% to 97% of the maximum sectional width SW of the tire. Particularly, the tread portion 1 is divided into a center zone 2 and two shoulder zones 3, 4. A distance D between two circumferentially extending grooves 5, 6 which constitute discontinuous points for giving discontinuity to the outer surface of the tread portion 1 in its sectional direction is determined as 50% to 95%, preferably 55% to 80% of the width TW of the tread portion 1. The circumferentially extending grooves 5, 6 are separated from the crown center Cc by substantially equal distance.

In the case of the tire having a round shoulder, the width TW of the tread portion 1 is defined by a distance between two points $P_1$ and $P_2$ where a straight line L passing through a center O of an arc formed by the outer surface of the sectional contour of the small zone of the round shoulder portions 3, 4 and having a radius $r$ and inclined from a rotary axis X—X of the tire by 45° on the one hand and the shoulder portions 3, 4 on the other hand cross each other.

In the case of the tire having a square shoulder, the width TW of the tread portion 1 is defined by a distance between both shoulder edges.

Experimental tests have yielded the result that the distance D between the two circumferentially extending grooves 5, 6 should have a value which is 50% to 95% of the width TW of the tread portion 1, and that the distance D which is longer than 95% of the width TW or shorter than 50% of the width TW results in a temperature rise of that portion of the tread which is near its ½ point.

The invention may also be applied to tires to be manufactured by the flat crown type mold shown in FIG. 5b and by the concave crown type mold shown in FIG. 5c. In these cases, both the shoulder zones Sz, Sz divided by the circumferentially extending grooves Gs, Gs, from the center zone Cz are protruded toward the outside of the mold M by a step having a level difference $d$ to make the continuous curves B, C forming the sectional contours of the outer surfaces of the treads discontinuous.

The dimension of the step $d$ depends not only on the performance characteristics required for individual tire, but also on the shape and construction of the tire, particularly a ratio of the distance D between the circumferentially extending grooves 5, 6 to the tread width TW and the like. It is preferable to determine the dimension of the step $d$ within a range from 0.5 mm to 6 mm.

Experimental tests have yielded the result that if the step $d$ is smaller than 0.5 mm, it is impossible to attain the faculty according to the invention, and that if the step $d$ is larger than 6 mm, the temperature rise of the shoulder region becomes abnormally high, thus giving rise to faults due to heat separation.

As a tire to be tested, a flat crown type tire having a size of 26×6.6 10PR is manufactured by the following steps.

Four tires according to the invention each having a carcass composed of 6 cord fabrics and containing 840 denier/two cords are molded by means of the mold shown in FIG. 5b. For the sake of comparison, four conventional tires each having a carcass also composed of 6 cord fabrics containing 840 denier/two cords are molded by means of the mold shown in FIG. 4b.

Each of all these tires has a tread width TW of 120 mm and a distance D between the circumferentially extending grooves of 72 mm.

In the tires according to the invention, the step $d$ is made 2.0 mm.

Both a high speed heat generation test and a wear resistance test were effected with the aid of a rotary drum.

Let an index of the highest temperature of the conventional tire molded by the mold shown in FIG. 4b be 100 and let an index of the lowest temperature thereof be 75, then the temperature distribution of the conventional tire is shown by dash lines in FIG. 6. On the contrary, the temperature distribution of the tire according to the invention molded by the mold shown in FIG. 5b shows its highest temperature at an index of 90 and its lowest temperature at an index of 84 and becomes substantially uniform as shown by a full line curve in FIG. 6.

The wear resistance drum tests have yielded the result that the wear resistance of the tire according to the invention is approximately 20% times higher than that of the conventional tire.

As explained hereinbefore, the pneumatic tire for airplanes according to the invention comprises a pair of circumferentially extending grooves 5, 6 each arranged at a shoulder portion of the tire and substantially symmetrically and equally spaced apart from a crown center Cc of the tire, a distance D between the circumferentially extending grooves 5, 6 being from 50% to 95%, preferably 55% to 80% of a tread width TW, the circumferentially extending grooves 5, 6 dividing a tread portion 1 of the tire into a center zone 2 and two shoulder zones 3, 4, a sectional contour defining an outer surface of the tread portion 1 being a continuous curved in respective zones, and the outer surface of the tire being protruded at both the shoulder zones 3, 4 toward the outside of the tire from the circumferentially extending grooves 5, 6 arranged at the shoulder portion of the tire by a step having a level difference 0.5 mm to 6 mm.

Thus, the invention provides an economical way of improving the high speed durability of the tire without sacrificing the wear resistance thereof, and can be applied effectively to the airplanes. In addition, the use of the measures described ensures a temperature distribution which is substantially uniform all over the zones of the tread portion and further provides the important advantage that circumferentially extending ribs located inside the circumferentially extending grooves are effectively prevented from being broken and that it is possible to effectively suppress occurrence of the eccentric wear of the shoulder zones.

What is claimed is:

1. In pneumatic tire for airplanes comprising a plurality of circumferentially extending grooves and a plurality of circumferentially extending ribs separated from each other by means of said grooves, the improvement comprising, a pair of circumferentially extending grooves each arranged at a shoulder portion of the tire and substantially symmetrically and equally spaced apart from a crown center of the tire, the distance between said circumferentially extending grooves arranged at the shoulder portions being, when the tire is inflated, from 50% to 95% of a tread width and dividing a tread portion of the tire into a center zone and two shoulder zones, a sectional contour defining an outer surface of said tread portion being a continuous curve in both the center zone and the two shoulder zones, and the outer surface of the tire being protruded at both said shoulder zones from said circumferentially extending grooves arranged at the shoulder portions of the tire toward the outside thereof by a step projected from said tread portion even after said tire is inflated and having a level difference when the tire is uninflated from 0.5 mm to 6 mm, whereby a ratio of the load subjected to said center zone to the load subjected to said two shoulder zones is reduced, thereby improving the high speed durability of the tire without sacrificing the wear resistance thereof.

2. A pneumatic tire for airplanes as claimed in claim 1, wherein said distance between said circumferentially extending grooves arranged at said shoulder portions of the tire is from 55% to 80% of said tread width.

3. A pneumatic tire for airplanes as claimed in claim 1, wherein said tread width is 120 mm, said distance between said circumferentially extending grooves arranged at said shoulder portions is 72 mm, and said level difference of the step is 2.0 mm.

4. A pneumatic tire for airplanes as claimed in claim 1, wherein said tread width is made from 70% to 97% of the maximum sectional width of the tire.

5. A pneumatic tire for airplanes as claimed in claim 1, wherein said tire is provided with round shoulder portions and said tread width is defined by a distance between two points where a straight line passing through a center of an arc formed by the outer surface of the sectional contour of the small zone of each of said round shoulder portions and inclined from a rotary axis of the tire by 45° on the one hand and each of said shoulder portions on the other hand cross each other and is from 70% to 97% of the maximum sectional width of the tire.

6. A pneumatic tire for airplanes as claimed in claim 1, wherein said uninflated tire is of a convex crown type.

7. A pneumatic tire for airplanes as claimed in claim 1, wherein said uninflated tire is of a flat crown type.

8. A pneumatic uninflated tire for airplanes as claimed in claim 1, wherein said uninflated tire is of a concave crown type.

* * * * *